Aug. 3, 1965    J. A. KRUSE ETAL    3,198,556
BRAZED JOINT AND METHOD OF MAKING THE SAME
Filed May 1, 1961    3 Sheets-Sheet 1

INVENTORS
JAMES A. KRUSE
THERIAN E. AUSTIN
BY
Charles F. Dischler
ATTORNEY

*INVENTORS*
JAMES A. KRUSE
*BY* THERIAN E. AUSTIN

ATTORNEY

Aug. 3, 1965  J. A. KRUSE ETAL  3,198,556
BRAZED JOINT AND METHOD OF MAKING THE SAME
Filed May 1, 1961  3 Sheets-Sheet 3

*INVENTORS*
JAMES A. KRUSE
THERIAN E. AUSTIN
BY

*Charles F. Dischler*
ATTORNEY

United States Patent Office 3,198,556
Patented Aug. 3, 1965

3,198,556
BRAZED JOINT AND METHOD OF
MAKING THE SAME
James A. Kruse, Manhattan Beach, and Therian E.
Austin, Long Beach, Calif., assignors to North
American Aviation, Inc.
Filed May 1, 1961, Ser. No. 106,773
4 Claims. (Cl. 285—93)

This invention relates to the joining of fluid conducting conduit members wherein capillary flow of a bonding material is utilized to achieve a permanent fluid tight joint between a fitting and a tube telescopically received therein. More particularly, it relates to the fabrication of joints for high strength tubing subjected to relatively high pressures and temperatures which incorporates provisions for preventing reduction in the physical properties of the tubing during the joining process.

The generally accepted method of connecting tubing for aircraft or missile use has heretofore normally utilized threaded fittings. A typical assembly would consist of two sleeves, two coupling nuts and a union. The mass of such an essembly becomes of extreme importance if it is to be useable in weight critical applications of the type found in the aerospace industry. Furthermore, threaded fittings require sufficient clearance to allow application of wrenches. In modern aircraft, the structure and systems components have become so crowded that in many locations there is no working room to allow use of the necessary wrenches. This is particularly true for larger size tube couplings which would require large wrenches for proper torquing. Another major disadvantage of threaded fittings is that they cannot be sufficiently swaged in the seal area to prevent leakage—particularly after sustaining vibration or thermal shock.

With the accelerated rate of technological development taking place in the aircraft and missile fields, hydraulic system requirements now call for pressures of 4,000 p.s.i. and higher and the ability to withstand ambient temperatures of 630° F. and above. To meet such pressure and temperature requirements and to reduce the system weight to an absolute minimum, tubing formed from a stainless steel of the precipitation-hardenable type in a work hardened and/or heat treated condition has the best physical properties presently available and affords the maximum efficiency and utility. Conventional fittings of the type for permanent attachment as by welding, soldering or brazing have been found totally unsatisfactory for assembly with work-hardened and/or heat-treated stainless steel tubing because of the excessive annealing of the tubing that occurs during the bonding process and the consequent reduction in strength of the tubing in the region adjacent the end of the fitting. In such conventional prior art brazed fittings the brazing alloy, whether prepositioned in the fitting or added during brazing, would be allowed to flow completely through the joint during the brazing process and form a fillet at the ends of the fitting as an indication that a satisfactory braze had been accomplished. Prior to the present invention, the only ways in which the disadvantages resulting from tube annealing could be overcome were by either increasing the tubing wall thickness in the area subject to annealing, as by upsetting or the like, by making all tubing oversize or providing collars over the annealed tube adjacent the ends of the fitting. Such procedures would not only be expensive but would necessarily result in an appreciable weight increase and would be totally unacceptable for an aerospace vehicle where weight is of such extreme importance. Another method for achieving a workable assembly with conventional fitting components would be by heat treating the assembly after the bonding operation in order to regain the optimum physical properties of the material. This latter method, however, would not be practical for joints which are to be assembled in place in the vehicle. Furthermore, this would result in an annealed tube area between the unaffected tubing and the post-braze treated area.

The present invention overcomes the above disadvantages and deficiencies by providing an arrangement and means for fabricating high-strength tube joints by capillary flow of a suitable high-strength bonding agent without producing undesirable annealing or weakening of the tube in the region adjacent the ends of the thin wall fitting. More specifically, this arrangement comprises a relatively thin-wall, lightweight fitting having one or more rings of solid brazing alloy prepositioned between the inner surface of the fitting and the tube outer surface and spaced axially inwardly from the end of the fitting. Intermediate the fitting end and the next adjacent brazing alloy ring a series of inspection ports are formed through the fitting walls and around the circumference thereof. Raising the temperature of an assembly formed of such a fitting and a tube telescopically received therein to brazing temperature causes melting of the brazing alloy ring or rings and results in capillary flow of the brazing alloy along the surface of the tube. Without some means of determining and precisely controlling the brazing alloy flow, the temperature of the tubing adjacent the ends of the fitting is normally raised to such an excessive extent, in order to insure capillary flow throughout the full extent of the faying surfaces of the tube and fitting, that annealing of the tubing occurs in the region adjacent the end of the fitting and, in particular, in the region where the tube is not encompassed or supported by the surrounding fitting which is stressed in hoop tension. Normally, the formation of a fillet of brazing alloy at the end of the fitting is considered evidence that such a tube annealing temperature has been exceeded for the precipitation-hardenable type of stainless steels under consideration. Upon being subjected to destructive testing, failure of such conventional filleted arrangements has invariably been found to occur by rupture of the unsupported tubing in the area immediately adjacent the end of the fitting. In the present invention, the brazing process is carried on in the normal manner until the brazing alloy flow is observed to have extended to the inspection ports or alternatively the temperature of the tube or the sleeve may be measured by any one of a number of standard temperature measuring instruments or techniques and the process programmed or controlled in accordance therewith. At substantially this point in time the brazing process is terminated to cause cessation of alloy flow to the end of the fitting thereby preventing annealing of the tubing near the end of the fitting and in particular in the unsupported region beyond the end of the fitting.

Accordingly, it is the primary object of this invention to provide a process and arrangement for achieving a permanent high-strength, lightweight tube joint of a simple design providing a high degree of reliability.

It is another object of the present invention to provide a means for preventing annealing of the tube near the end of the fitting of a brazed tube joint and in particular for preventing annealing of that portion of unsupported tube adjacent the joint.

It is also an object of this invention to provide a means for permitting either visual inspection and control over the brazing alloy flow or automatic monitoring and control of the flow whereby such flow may be terminated short of the end of the fitting.

It is a further object of this invention to provide an arrangement for effecting a brazed tube joint, wherein the formation of fillets at the end of the joint fitting may be prevented and the alloy flow may be controlled to stop at a predetermined distance from the end of the fitting by suitable regulation of the thermal cycle.

It is a still further object of this invention to provide a brazing fitting for connecting tubing having a positive predetermined diametral clearance intermediate its ends to ensure circumferential flow of the brazing alloy and further having a reduced diametral section at each end tending under certain conditions to restrict the brazing alloy flow.

These and other objects and advantages of the present invention will become apparent to those skilled in the art after reading the present specification and the accompanying drawings forming a part thereof, in which.

Figure 1:
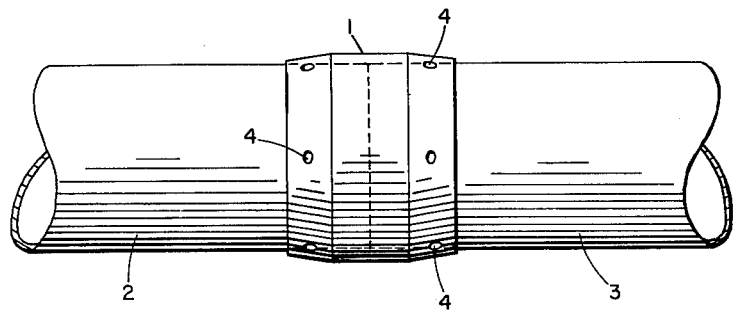
FIG. 1 is a perspective view of a brazed union or coupling according to the present invention joining together adjacent conduit members in a colinear relationship.

Referring specifically to the drawings and at first observing FIG. 1, a typical brazed joint fitting 1, according to the present invention, is shown interconnecting two axially aligned portions 2 and 3 of comparatively thin-wall pipe or tubing. Fitting 1 includes a plurality of apertures 4 circumferentially spaced therearound and positioned in close proximity to, but spaced inwardly from each end of the fitting. These apertures form an important part of the present invention and perform a function that will be fully described hereinbelow. While variously illustrated herein as a brazing union or a T-fitting, it is to be understood that the invention is equally applicable to all types of tubing fittings such as elbows, crosses, reducers, caps, valve ends and the like provided the fitting is adapted to telescopically receive the end of a length of tubing.

While the present invention has applicability to any bonding process, such as soldering, brazing, welding, and the like, wherein a molten filter metal is distributed between the closely fitted surfaces of a joint, it will be specifically described herein in the context of a brazing process. The American Welding Society defines brazing as "a group of welding processes wherein coalescence is produced by heating to a suitable temperature above 800° F. and by using a nonferrous filler metal, having a melting point below that of the base metals." The filler metal in the present invention is distributed between the closely fitted surfaces of the joint by capillary action. While any suitable heat source may be utilized in the brazing process, the optimum heat source for in-place tube joint brazing has been found to be by means of an induction coil. The heat induced in the outer portion of a tube and fitting assembly that is subjected to induction heating by an encircling work coil is transmitted to the sleeve interior by conduction and radiated from the sleeve inner surface to the tube surface prior to alloy flow. The mass of the sleeve or fitting, the gap between the sleeve and tube and the wall thickness of the tubing all have an effect on the conduction of the induced heat. Heat transfer to the surface of the tubing is accomplished largely by means of the brazing alloy as it becomes molten and flows along the tubing. The time-temperature cycle required to braze precipitation-hardenable steel tubing is critical due to the possibility of overaging or annealing of the tubing wherein a significant loss of strength results.

Figure 9:
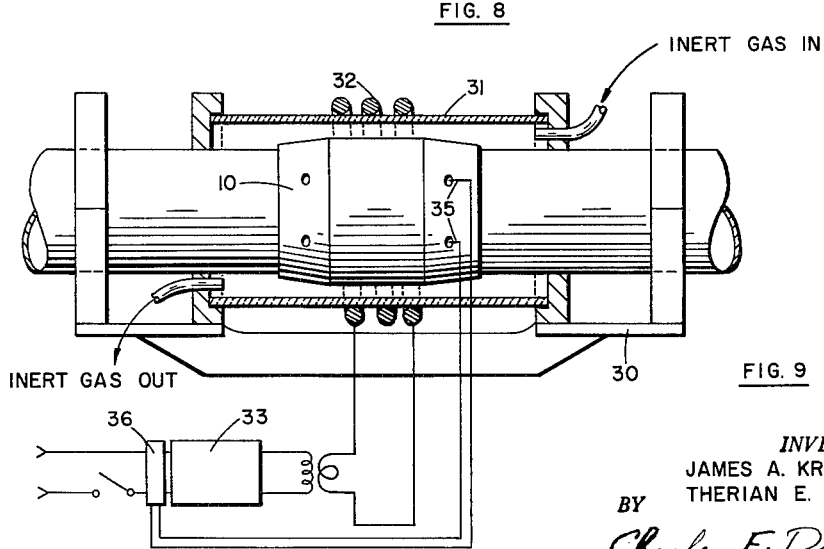
FIG. 9 illustrates, partially in cross section and partly in schematic, an arrangement for practicing the brazing process of the present invention.

Close control of the heat transfer to the tube and fitting assembly is extremely important in the joint brazing process. For example, utilizing a 3 turn induction heating coil as shown in FIG. 9 positioned essentially around the medial portion of the sleeve and bringing the temperature up swiftly, the temperature near the ends of the assembly may be kept relatively low thereby hindering flow of the braze alloy in the critical end areas. This give a plateau type thermal cycle curve of temperature vs. distance along the fitting assembly exhibiting a substantially uniform temperature over the central portion of the sleeve with decreasing temperature therefrom outwardly to the ends of the sleeve. Conversely, if the brazing temperature is achieved slowly, the whole tube and fitting assembly has sufficient time to rise to a fairly uniform high temperature thus giving a substantially straight or flat shallow thermal cycle curve of temperature vs. distance along the assembly. This latter type of thermal cycle is, of course, highly undesirable since annealing or overaging of the adjacent unsupported tube portions is likely to occur. This latter type of thermal cycle would also be achieved if the work coil were to be wound substantially along the full length of the joint assembly. Thus, a large degree of control of the thermal cycle and consequently of the flow of the brazing alloy may be achieved by proper sizing and location of the work coil relative to the joint in conjunction with a means allowing termination of the brazing thermal cycle at the proper time. The present invention is concerned with such a unique and practical means for terminating the brazing cycle at a proper predetermined time to prevent a deterioration in the physical properties of the structure. Temperatures sufficient for the braze alloy to flow and wet the surface of the precipitation-hardenable stainable stainless steel tubing will usually be high enough to reduce the mechanical properties, especially of the tubing thicknesses herein under consideration and more full described in the subsequently disclosed examples. Thus, proper flow of the braze alloy, so that it is controlled and confined to areas in the joint that will be supported by the encompassing fitting and the tubing yield and ultimate strength will not be significantly reduced in unsupported areas, requires a precise control of the thermal cycle and the heat flow from the induction heated fitting to the surface of the tubing.

Figure 2:
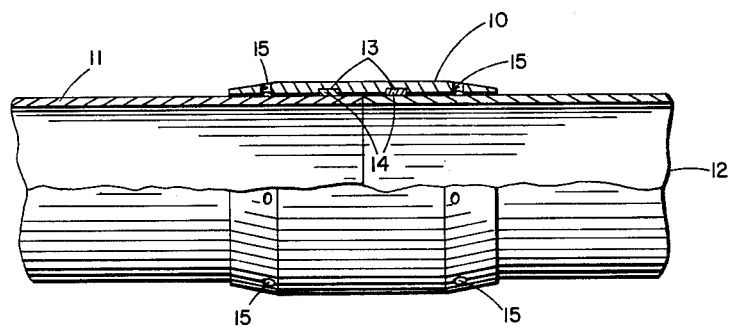
FIG. 2 is a view, partly in section and partly in elevation, of a union-type joint according to the present invention and is an embodiment illustrating the basic features of the invention.

The basic union or fitting configuration for achieving such a result, in accordance with our invention, is shown in FIG. 2. Union 10 therein is emplaced in a prebrazing position over the abutting ends of conduit sections 11 and 12. Annular grooves 13 formed in the inner surface of the body of union 10, one on either side of the transverse center line, contain rings 14 of brazing alloy preplaced therein. A plurality of inspection ports 15 are formed near each end of the union and circumferentially therearound. Approximately six such ports spaced around the circumference of the union have been found to adequately serve the purpose and permit either inspection, control or both of the brazing alloy flow.

Figure 3:
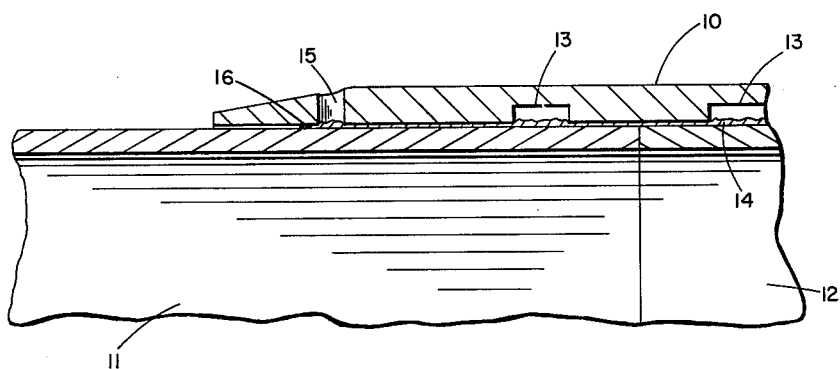
FIG. 3 is an enlarged fragmentary sectional view of a portion of the basic embodiment of FIG. 2.

Upon the application of sufficient heat to the union and the brazing alloy ring 14 contained therein, the liquidus temperature of the alloy is exceeded and if the temperature of the outer surface of the tubing and the inner surface of the union is sufficiently high to permit wetting thereof, capillary flow will take place along the tubing. FIG. 3 illustrates the union of FIG. 2 after alloy flow has occurred. As the flow takes place and reaches ports 15 and becomes visible to the eye of the brazing operator, the application of heat may be halted, as by turning off the induction heating device, and the brazing alloy is allowed to cool to a solid state condition. The brazing alloy under some conditions will not flow across the open area of the inspection ports but will only form a fillet visible to the operator at the edge of the port. At such a time as the braze alloy is visible in the inspection ports and may have formed fillets in the ports a certain amount of the alloy may also have flowed a controlled distance beyond the inspection port toward the end of the tubing depending upon the operating thermal cycle. Flow to the end of the union can thus be controlled and no fillet will be formed around the union end. Stopping the flow of the brazing alloy while it is still contained within the union assures that the tubing near the end of the union and particularly that portion of the tubing that is not supported in hoop tension by the union and which extends beyond the union end and immediately adjacent thereto will not have been annealed or have suffered a loss in its tensile or yield strength properties.

A more precise form of control is illustrated in FIG. 9. Herein thermocouples 35 are located in at least several of the inspection ports and electrically connected to a suitable relay or switch 36 located in the induction generator circuit for interrupting the circuit. Preferably the thermocouples should be attached to the tubing. The thermocouple circuit may be calibrated to program the power output from the induction generator to the work coil or it may be utilized to open the generator circuit and cause a cessation of joint heating in response to any desired temperature condition at the inspection holes. For instance, with a plateau type of thermal cycle it may be sufficient to make the thermocouples responsive to contact by the flowing molten braze alloy, or it may be desirable to cause the thermocouple circuit to exercise its control function prior to contact by the braze alloy. The important objective in each instance is proper correlation of all of the parameters to prevent alloy flow from substantially approaching the ends of the fitting. In addition to control of the braze alloy flow by means of thermocouples, other standard temperature measuring techniques and instruments, such as are illustrated by devices dependent on radiation or magnetic properties, may be employed either for programming or shut-off of the braze cycle.

By way of a specific, but non-limitative, example, satisfactory brazing by capillary flow of a silver base brazing alloy between AM350-type stainless steel tubing and AM355-type steel fitting fittings, from one quarter to two inches in diameter, can be accomplished with a nominal diametral clearance of from two to eight mils or of one to four mils radial clearance between the faying surfaces or interfaces. Capillary flow will occur with clearances as large as ten mils, but the shear strength decreases very rapidly with clearances larger than three mils. Thus, taking into account these factors, as well as the expense of holding close tolerances, the accepted allowable tolerance preferably should be held from one to four mils between the faying tube and fitting surfaces.

Figure 4:
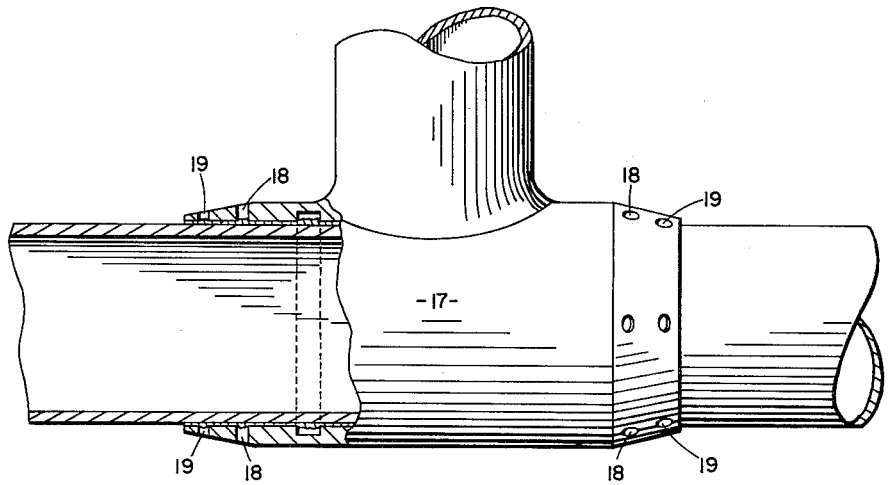
FIG. 4 is a view, partly in section and partly in elevation, of a T-type fitting according to the present invention and illustrating a different form of the invention.

FIG. 4 illustrates a modification of the basic control mechanism incorporating two circumferential rows of holes on each end of a T-fitting 17, one row of holes 18 being spatially displaced in an axial direction from the other circumferential row of inspection ports 19. The inner series of ports 18, called the "go" holes, must show the presence of the brazing alloy flow, while the other series of circumferential ports 19, called "no go" holes, must not show the presence of brazing alloy to assure that the tubing at the end of the union has not been annealed. Here again, the critically annealed tubing is supported in hoop tension by the fitting sleeve ends; however, the lack of any alloy flow in the "no go" holes gives greater assurance that the critically annealed tubing area lies under the sleeve ends and not in the unsupported region proximate to the fitting end.

Figure 5:
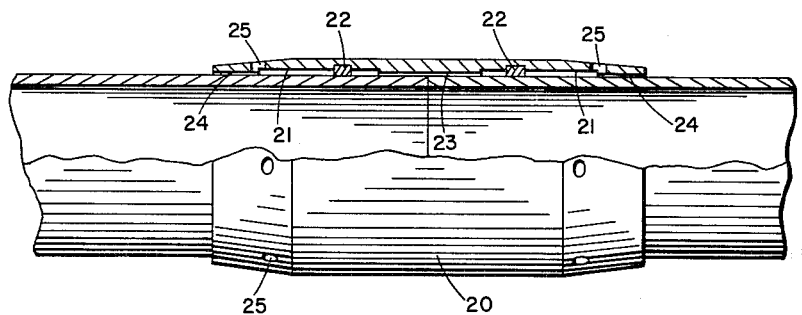
FIG. 5 is a view, partly in section and partly in elevation, illustrating the preferred embodiment of the invention.

In the embodiments of FIGS. 2, 3 and 4, wherein the union has a straight through bore, perfect alignment of the tubing is necessary for achieving a satisfactory braze. This is difficult for "in place" brazing, because of manufacturing tolerances. Any angular misalignment of the tubing will cause the union to be "cocked" on the tubing. This can result in zero clearance at the ends of the sleeve in contact with the tubing and an excessive gap on the opposite sides. The preferred embodiment of FIG. 5 illustrates a design whereby nearly perfect alignment of the tubing is achieved, by means of a relatively tighter fit on the tubing at the ends and center of the fitting, thus preventing such cocking. As shown in FIG. 5, the preferred embodiment comprises a brazing union 20 having an annular groove 21 formed symmetrically on each side of the union transverse center line. Grooves 21 preferably have a nominal radial depth of approximately two to three mils for tubes ranging in size from one-half to one and one-half inches. Larger size tubes may have up to 4 mils radial clearance. Secondary grooves 24 are formed in the outer surface of grooves 21 for accommodating the solid rings of brazing alloy to be preplaced therein prior to assembly of the joint. Provision of grooves 21 results in formation of inwardly projecting annular portions 22 at each end and portion 23 intermediate the ends of the union. These projecting or raised portions and the mating tubing are machined to a close cylindrical match with a clearance of approximately one thousandth of an inch. This automatically insures that the close axial alignment between the tube and the fitting, which is necessary for satisfactory circumferential flow, is attained. Furthermore, by properly selecting the sleeve and tubing from materials having differential shrinkage or grain growth properties, as, for example, a sleeve of AM355 stainless steel and tubing of AM350 stainless steel, the sleeve annular end portions 22 and intermediate portion 23 may be caused to shrink into a contacting or substantially contacting relationship with the tube. When this condition pertains, such end portions will tend to serve as a restriction to the flow of molten brazing alloy out the end of the sleeve. Depending on the type of brazing alloy used, the condition of the faying surfaces of the sleeve and tube, the thermal cycle, and the like, such flow will tend to be restricted when the radial clearance is less than approximately one mil.

Figure 6:
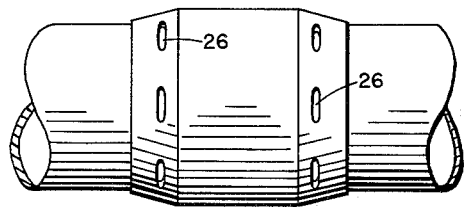
FIGS. 6 and 7 illustrate several modifications of the invention showing various inspection port and aperture configurations.
Figure 7:
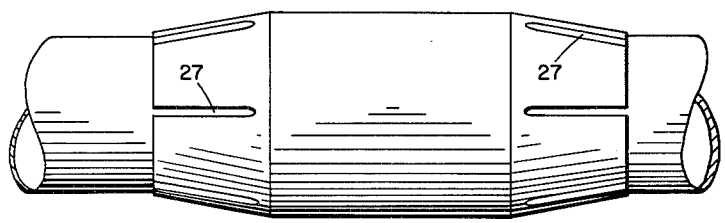

FIGS. 6 and 7 illustrate further modifications relative to various types of inspection ports which may be utilized in the practice of the present invention. FIG. 6 illustrates a series of transversely elongated inspection ports or slots 26 extending circumferentially around the periphery of the sleeve end. These slots permit visual inspection of a greater area of the alloy flow. Along with this advantage, however, goes the disadvantage occasioned by weakening the cross section of the fitting. FIG. 7 illustrates a series of slotted inspection ports 27 extending in an axial direction outwardly to the very end of the fitting. While ports of this nature clearly provide the optimum in the way of visual inspection and control of the flow in the critical area at the end of the fitting, they also have the disadvantage of seriously weakening the fitting in the very area where the fitting must provide support in hoop tension for the tubing encompassed therein.

Figure 8:
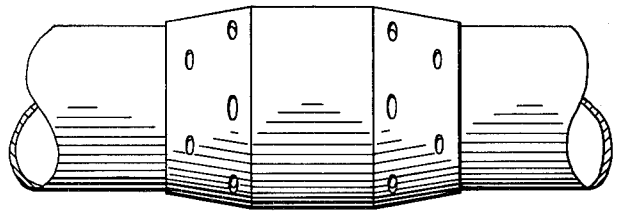
FIG. 8 illustrates another modified embodiment showing one of a number of possible combinations of inspection slots and holes.

FIG. 8 illustrates another possible modification, wherein slots and holes have been combined into a "go, no go" configuration having a relatively significant "heat dam" or retardation effect in the conduction of heat longitudinally through the sleeve.

*The brazing process*

The process of brazing a union-type fitting of the class described and shown in FIG. 5 by induction heating first requires installation of a holding fixture 30 as shown in FIG. 9 for supporting and aligning the tubing, supporting and sealing the ends of a split Pyrex glass purge shield 31 and for supporting an induction work coil 32. The holding fixture aligns the tube ends so the union will be free to rotate without a preload, thus insuring that the capillary gaps are within tolerance. Work coil 32 is connected to a high frequency induction generator 33 of any conventional and commercially available type, such as a 15 kw. model C1500 induction generator manufactured by the Thermonic Induction Heating Corp. of Brooklyn, New York.

The tubing to be joined by brazing must be free of scale, flux residue and loose particles and the braze alloy must have good physical strength at high temperatures to insure that the quality of the installed system will approach 100% perfection and thus allow proper functioning of a 4,000 p.s.i. hydraulic system for an aerospace vehicle. Use in such a system of high-strength, thin-wall tubing joined by brazing will effect a weight saving of more than 50% over a conventional system employing nonheat-treatable 300 series stainless steels assembled with AN and MS standard fittings.

To prevent formation of flux residue, no flux is used in the brazing process. Instead, purging and shielding by an inert gas of low moisture content is used to eliminate the presence of any contaminating atmosphere within the purging enclosure and the interior of the tubing. Non-limiting examples of such gases are argon, helium and even hydrogen if used under closely controlled conditions. Shielding is necessary as the atmosphere, if not eliminated, will oxidize the parts when the tubing joint is heated to the brazing temperature. Brazing flux is not used on tube joints of the class described because the flux cannot be readily removed from inside the tube after the joint is complete. The inert gas shielding achieves the same purpose as the flux would but leaves no residue to contaminate the liquids the tubes will carry.

It is desirable that, in addition to exhibiting good strength at elevated temperatures, the brazing alloy have as low a brazing temperature as possible to minimize annealing of the heat treated tubing. Thus, a commercially available eutectic composition of 71.8% silver, 28% copper, with the addition of 0.2% lithium, having a brazing temperature of approximately 1450° F., has been found satisfactory.

With the tubing and union cleaned and mounted in the fixture 30 and the rings 34 of brazing alloy preplaced within the union, all as shown in FIG. 9, purge gas is allowed to flow for approximately two minutes prior to brazing. The induction coil is then energized and the inspection ports 25 closely monitored until the flow of molten braze alloy is visually observed to have reached the region of the ports or until the thermocouple circuit is actuated. The induction coil is then deenergized and the brazing cycle is complete. A slight amount of alloy flow both up into the inspection ports and beyond the ports may occur before the alloy cools to its solidus temperature. However, such terminal flow is not sufficient to significantly affect the strength of the heat treated stainless steel tubes in their critical unsupported region and may be closely controlled by utilizing a proper thermal cycle in conjunction with the disclosure of the present invention.

The mass of the sleeve, the gap between the sleeve and tube and the wall thickness of the tubing all have an effect on the conduction of the induction heat. In addition, variables due to the length of the coaxial cable connecting the induction coil and the generator and its impedance, along with the configurations and inside diameter of the heating coil, will greatly affect the percent of power and the length of time required for brazing a given joint. Using a 15 kw. generator with 10 foot long water cooled coaxial leads and a wound copper induction coil, a typical braze for a ¾" O.D. tube having a wall thickness of .028 inch required but 7.5 seconds. Similarly, a braze of a 1½" O.D. tube having a wall thickness of .058 inch required only 18.5 seconds.

*Examples*

Since advanced aircraft and missiles require high strength to weight ratio hydraulic lines and fittings, the fittings must exhibit optimum physical properties such as tensile strength, yield strength, elongation, etc., at elevated temperatures. For this reason, precipitation hardenable stainless steels of the AM350 and AM355 type were chosen as best meeting the specified environmental conditions for the thin wall tubing and fittings, respectively for high-pressure, high-temperature hydraulic systems. In other types of fluid systems other kinds of materials such as hardened austenitic steels may be utilized. The fitting and brazing process of the present invention is equally efficaceous with such other materials and is not limited to use solely with precipitation hardenable stainless steels. AM350 and AM355 are chromium-nickel-molybdenum stainless steels manufactured by the Allegheny Ludlum Steel Corporation. A typical AM350 composition comprises 0.08% carbon, 17.0% chromium, 4.20% nickel, 0.60% manganese, 0.4% silicon and 2.50% molybdenum. A typical AM355 composition includes 0.12% carbon, 15.5% chromium, 4.50% nickel, 1.00% manganese, 0.40% silicon and 2.75% molybdenum.

AM350, either in a sub-zero cooled and tempered condition (S.C.T.) or in a cold reduced and tempered condition (C.R.T.), exhibits a room temperature ultimate tensile strength of 185,000 p.s.i. maximum and minimum, respectively, and a minimum yield strength of 140,000 p.s.i. in each condition. In an annealed condition the ultimate tensile strength drops to 180,000 p.s.i. maximum and the yield strength to 75,000 p.s.i. maximum. It is thus clear that annealing of the AM350 tubing must be prevented in order to preserve the original high strength properties of the material.

For the purpose of these tests, the sleeves and fittings were machined from AM355 (CRES) bar stock (corrosion-resistant alloy in the equalized condition) with a hardness of approximately 35 on the Rockwell C scale.

Example I . . . Ten specimens of sleeve joints comprised of ¾" O.D. by .028" thick AM350 (C.R.T.) tubing and AM355 (CRES) sleeve unions were brazed in accordance with the present invention as described above and as illustrated in FIGS. 5 and 9 but with visual control. These joints were then proof-tested to failure. In each instance, failure of the tube occurred at a region at least one tube diameter from the end of the union with the average distance therefrom being at least 1½ diameters. Burst pressures ranged from a low of 12,000 p.si. to a high of 13,300 p.s.i. with an average burst pressure of 12,920 p.s.i. or more than three times the required design pressure of 4,000 p.s.i.

Example II . . . Five specimens of sleeve joints comprised of 1½" O.D. x .058" thick AM350 (C.R.T.) tubing and AM355 (CRES) sleeve unions were brazed in accordance with the present invention as described above and using joints of the preferred configuration of FIG. 5. These joints were also proof-tested to failure. Here again, failure occurred in the tubing beginning at a region at least one tube diameter removed from the end of the union and averaging approximately two diameters therefrom. Burst pressures range from 12,600 p.s.i. to 13,800 p.s.i., with an average burst pressure of 13,280 p.s.i.

Example III . . . Three specimens of sleeve joints comprised of ¾" O.D. x .035" thick AM350 (C.R.T.) tubing and AM355 (CRES) sleeve unions were brazed in a manner to allow fillet formation at the ends of the union. Upon proof-testing to failure, the tubing burst immediately adjacent the end of the union in each instance, with individual burst pressures of 8,000 p.s.i., 10,400 p.s.i. and 12,600 p.s.i. or an average burst pressure of 10,330 p.s.i. for a tube wall thickness of .035" as compared to an average burst pressure of 12,920 p.s.i. and a wall thickness of .028" for the ¾" O.D. specimens of Example I brazed in accordance with this invention.

The tests of these examples clearly demonstrate that with the process of this invention and utilizing the fitting arrangement disclosed herein, annealing and weakening of the high strength tubing adjacent the ends of the fitting was effectively eliminated.

From the above description, it will be evident that by the present invention we have provided a minimum weight, permanent joint arrangement having provision for controlling the flow of brazing alloy and preventing the weakening of the associated tubing by overheating and annealing thereof. Additionally, the present arrangement permits of installation without the prerequisite of axial motion for the tubing. While the tapered type of brazing fitting described in copending application Serial No. 821,308, now Patent No. 3,032,870, probably approaches the optimum configuration for a brazed joint, it has a serious limitation in requiring a certain amount of axial movement of the associated tubing in order to achieve the correct relationship of the mating parts. Thus, while this particular fitting may be used to a large extent during initial bench construction of component portions of a hydraulic system, it normally cannot be used for brazing in place in a crowded hydraulic installation, as in an aircraft or missile structure, where such axial movement is limited or nonexistent. Similarly, it cannot be used in repair operation, wherein a length of tubing must be removed by being cut out and then reinstalled. The sleeve of the present invention, however, since it has a straight through bore permits installation of tubing without axial motion. Thus, the sleeve may be slipped fully over a section of tubing to be installed in the system, the tubing inserted into place with a sideways motion and the sleeve then slid axially over the adjacent section of tubing to which the first section is to be brazed.

While particular embodiments of this invention have been illustrated and described herein, it will be apparent that various changes and modifications may be made in the construction and arrangement of the various parts without departing from the spirit and scope of this invention in its broader aspects or as defined in the following claims.

We claim:

1. In a lightweight thin-wall, high-temperature, high-pressure brazed hydraulic system for aerospace vehicles, a brazing fitting comprising a thin-wall stainless steel first member having a bore therethrough; a thin wall tubular second member adapted to be received in the bore of said first member, said second member being of a stainless steel that is subject to annealing at the temperature required to melt and flow the brazing alloy with a consequent loss of strength thereof; said second member having an external diameter less than the diameter of said first member bore by a predeterminately slight amount for permitting wetting of the complementary surfaces of the fitting bore and the surface of said second member by liquid brazing alloy and inducing capillary flow of such liquid brazing alloy therebetween; a ring of brazing alloy positioned within said first member and spaced axially inwardly of the end of said first member prior to brazing; and means adjacent the end of said first member between said brazing alloy ring and the end of said first member for permitting visual inspection and control of the extent of the capillary flow of liquid brazing alloy outwardly toward the end of the first member during brazing whereby forming of a fillet of brazing alloy at the end of said first member and annealing of the unsupported portion of said second member adjacent the end of the first member is prevented.

2. In a hydraulic system as described in claim 1, wherein the means for permitting visual inspection and flow control of the brazing alloy comprises a multiplicity of inspection ports spaced annularly around said first member.

3. In a hydraulic system as described in claim 1, wherein the means for permitting visual inspection and flow control of the brazing alloy comprises at least a duality of axially spaced annular rows of inspection apertures through said member and around the circumference thereof.

4. In a lightweight thin-wall, high-temperature, high pressure, brazed hydraulic system for aerospace vehicles, a brazing fitting comprising a thin-wall stainless steel fitting member having a bore therethrough adapted to telescopically receive a thin wall tubing member, said tubing member being of a stainless steel that is subject to annealing at the temperature required to melt and flow the brazing alloy with a consequent loss of strength thereof, said fitting member having an internal annular cavity intermediate an end and its medial portion, said fitting further having a radial clearance from the tubing member over a major portion of its axial length sufficient to sustain capillary flow of a brazing alloy and having a restricted longitudinally extending radial clearance from the tubing member at the fitting member end portion to impede capillary flow of a brazing alloy; a ring of solid brazing alloy preplaced in said annular cavity for flow by capiliary action between said fitting member and the tubing member during brazing; and flow control apertures annularly spaced around said fitting member intermediate said annular cavity and the end of said fitting member for permitting fillets of brazing alloy to first be formed in said apertures before capillary flow of the brazing alloy reaches the end of the fitting and for permitting detection of such fillets whereby flow of the brazing alloy may be controlled during brazing and brazing alloy flow beyond the end of the fitting member prevented.

References Cited by the Examiner

UNITED STATES PATENTS

| | | | |
|---|---|---|---|
| 592,991 | 11/97 | Lewis | 285—93 |
| 654,131 | 7/00 | Burke | 285—287 |
| 693,830 | 2/02 | Burke | 285—287 |
| 1,776,502 | 9/30 | Gresley | 285—287 |
| 2,040,092 | 5/36 | Leedy | 285—287 |
| 2,184,534 | 12/39 | Smith et al. | 285—21 X |
| 2,460,668 | 2/49 | Wurzburger | 285—287 X |
| 2,633,374 | 3/53 | Boice | 285—287 |
| 2,684,043 | 7/54 | Hughes | 285—287 |
| 2,984,899 | 5/61 | Richter | 285—93 |
| 3,069,187 | 12/62 | Collins | 285—110 |

FOREIGN PATENTS

| | | |
|---|---|---|
| 422,055 | 1/35 | Great Britain. |
| 542,958 | 2/42 | Great Britain. |

OTHER REFERENCES

Elements of Materials Science by Van Vlack (1959) Addison-Wesley Publishing Company, Inc., page 85, paragraph 4–10.

How and Where to Use Electric-Furnace Brazing by H. M. Webber (1939), pages 37, 49. General Electric Company, publication, 29–484.

CARL W. TOMLIN, *Primary Examiner.*